United States Patent
Treimer et al.

(10) Patent No.: US 8,201,775 B2
(45) Date of Patent: Jun. 19, 2012

(54) IMPROVED DECOMPRESSION DEVICE WITH ADJUSTABLE RELEASE PRESSURE

(75) Inventors: Thomas Treimer, Laupheim (DE); Ingo Hildebrand, Laupheim (DE); Hubert Stützle, Laupheim (DE)

(73) Assignee: Airbus Deutschland GmbH, Hamburg (DE)

( * ) Notice: Subject to any disclaimer, the term of this patent is extended or adjusted under 35 U.S.C. 154(b) by 651 days.

(21) Appl. No.: 12/334,856

(22) Filed: Dec. 15, 2008

(65) Prior Publication Data

US 2009/0159748 A1 Jun. 25, 2009

Related U.S. Application Data

(60) Provisional application No. 61/015,236, filed on Dec. 20, 2007.

(30) Foreign Application Priority Data

Dec. 20, 2007 (DE) .............................. 102007061433

(51) Int. Cl.
*B64D 13/04* (2006.01)
(52) U.S. Cl. ..................... 244/118.5; 244/129.1; 454/71; 165/235
(58) Field of Classification Search ................... 244/120, 244/121, 129.1, 129.4, 129.5, 118.5, 1 R; 220/367.1, 203.1, 203.09, 203.01, 203.11; 454/71; 165/235
See application file for complete search history.

(56) References Cited

U.S. PATENT DOCUMENTS

| | | | | | |
|---|---|---|---|---|---|
| 2,679,467 | A | * | 5/1954 | James | 52/208 |
| 3,571,977 | A | * | 3/1971 | Abeel | 49/379 |
| 4,033,247 | A | * | 7/1977 | Murphy | 454/76 |
| 4,276,725 | A | * | 7/1981 | Ash | 52/167.9 |
| 4,383,666 | A | * | 5/1983 | Allerding et al. | 244/118.5 |
| 4,390,152 | A | * | 6/1983 | Jorgensen | 244/118.5 |
| 4,418,881 | A | * | 12/1983 | Bouldin | 244/224 |
| 4,432,514 | A | * | 2/1984 | Brandon | 244/118.5 |
| 4,498,261 | A | * | 2/1985 | Wilson et al. | 52/1 |
| 4,576,088 | A | * | 3/1986 | Mathewes et al. | 454/194 |

(Continued)

FOREIGN PATENT DOCUMENTS

DE 3715328 8/1988

(Continued)

OTHER PUBLICATIONS

German Patent Office, First Office Action in German Patent Application No. 102007061433.2, dated Dec. 15, 2011.

*Primary Examiner* — Benjamin P Lee
(74) *Attorney, Agent, or Firm* — Wood, Herron & Evans, LLP

(57) ABSTRACT

The invention relates to a decompression element for pressure equalization in a cabin of an aircraft, with a decompression element frame, a flap, and a hinge element or at least one bearing element for fitting the flap to the decompression element frame. The hinge element or the bearing element can be produced from a plastics material. A decompression device for decompressing a cabin area includes a decompression device frame, a first opening which enables a flow to take place between a line of an air-conditioning system of the aircraft and the interior space of the decompression device, a second opening which enables a flow to take place between the cabin area and the interior space of the decompression device, and a third opening receiving the decompression element with the flap.

11 Claims, 5 Drawing Sheets

U.S. PATENT DOCUMENTS

| | | | | |
|---|---|---|---|---|
| RE32,554 E | * | 12/1987 | Murphy | 244/118.5 |
| 4,899,960 A | * | 2/1990 | Hararat-Tehrani et al. | 244/118.5 |
| 5,046,686 A | * | 9/1991 | Carla et al. | 244/118.5 |
| 5,069,401 A | * | 12/1991 | Shepherd et al. | 244/118.5 |
| 5,085,017 A | | 2/1992 | Hararat-Tehrani | |
| 5,118,053 A | * | 6/1992 | Singh et al. | 244/118.5 |
| 5,137,231 A | * | 8/1992 | Boss | 244/118.5 |
| 5,765,883 A | * | 6/1998 | Dessenberger et al. | 292/92 |
| 5,843,558 A | * | 12/1998 | Yoshizaki et al. | 428/112 |
| 5,871,178 A | | 2/1999 | Barnett et al. | |
| 5,875,996 A | * | 3/1999 | Borgia | 244/118.1 |
| 6,029,933 A | * | 2/2000 | Holman et al. | 244/118.5 |
| 6,129,312 A | * | 10/2000 | Weber | 244/118.5 |
| 6,223,473 B1 | * | 5/2001 | Romig | 52/1 |
| 6,264,141 B1 | * | 7/2001 | Shim et al. | 244/118.5 |
| 6,273,365 B1 | * | 8/2001 | Hiesener et al. | 244/118.1 |
| 6,276,026 B1 | * | 8/2001 | Wille | 16/250 |
| 6,299,525 B1 | * | 10/2001 | Scheffler et al. | 454/76 |
| 6,411,525 B1 | * | 6/2002 | Zeiss | 361/809 |
| 6,651,932 B2 | * | 11/2003 | Diehl et al. | 244/129.1 |
| 7,172,154 B2 | * | 2/2007 | Tomiyama et al. | 244/118.5 |
| 7,234,278 B2 | * | 6/2007 | Eijkelenberg et al. | 52/99 |
| 7,275,560 B2 | * | 10/2007 | Rogge | 137/527 |
| 7,568,659 B2 | * | 8/2009 | Roques et al. | 244/121 |
| 7,578,475 B2 | * | 8/2009 | Pratt et al. | 244/129.4 |
| 7,628,167 B2 | * | 12/2009 | Eijkelenberg et al. | 137/68.23 |
| 2003/0127563 A1 | * | 7/2003 | LaConte | 244/129.1 |
| 2003/0168553 A1 | * | 9/2003 | Diehl et al. | 244/129.1 |
| 2005/0082433 A1 | | 4/2005 | Saku et al. | |
| 2005/0116100 A1 | | 6/2005 | Pratt et al. | |
| 2009/0179110 A1 | * | 7/2009 | Leyens | 244/129.4 |
| 2010/0187358 A1 | * | 7/2010 | Voss et al. | 244/129.4 |
| 2010/0294887 A1 | * | 11/2010 | Depeige | 244/129.5 |
| 2010/0320318 A1 | * | 12/2010 | Roth et al. | 244/118.5 |

FOREIGN PATENT DOCUMENTS

| | | |
|---|---|---|
| DE | 3922025 | 8/1990 |
| DE | 4216277 A1 * | 11/1993 |
| DE | 102005063076 | 7/2007 |
| DE | 60310188 | 9/2007 |
| EP | 1186531 | 3/2002 |
| EP | 1447326 | 8/2004 |

* cited by examiner

IMPROVED DECOMPRESSION DEVICE WITH ADJUSTABLE RELEASE PRESSURE

CROSS-REFERENCE TO RELATED APPLICATIONS

This application claims the priority of U.S. Provisional Application No. 61/015,236, filed on Dec. 20, 2007, the entire disclosure of which is incorporated by reference herein.

TECHNICAL FIELD

The invention relates to an improved decompression unit with a prolonged operating life and an adjustable release pressure for pressure equalization in a cabin of an aircraft in an emergency.

BACKGROUND

Commercial aircraft which are currently in use comprise a pressurized cabin whose internal pressure is maintained at a pressure level which is higher than ambient pressure, i.e. atmospheric pressure, which is reduced at high altitudes, during flight by an air-conditioning system supplied with power unit bleed air, for example. The pressure in the interior of the cabin of a commercial aircraft when the aircraft is in flight, i.e. when the aircraft is at cruising altitude, generally corresponds approximately to atmospheric pressure at an altitude of 8000 feet (approximately 2400 m). A pressurized cabin of an aircraft usually comprises several areas which are separated from one another by appropriate partitions and/or intermediate floors, such as, e.g. cockpit, passenger cabin, crew rest compartment, upper deck, main deck or cargo compartments.

In order in the event of decompression, i.e. in the event of a pressure drop in an area of the aircraft cabin maintained at an elevated pressure during flight, to prevent damage to the partitions and/or intermediate floors which separate the area of the aircraft cabin affected by the decompression from the aircraft cabin areas surrounding this area, pressure equalisation between the area of the aircraft cabin affected by the decompression and the aircraft cabin areas surrounding this area must be possible in a decompression situation. So-called decompression panels are for this reason usually provided in partitions and/or intermediate floors which serve to separate from one another different areas of an aircraft cabin which is maintained at a pressure which is higher than ambient pressure.

These decompression panels are integrated into the partitions and/or intermediate floors provided in the aircraft cabin such that they move out of their position and clear a pressure equalisation opening when there is a predetermined pressure difference between the areas of the aircraft cabin which are adjacent to one another and separated from one another by the partitions and/or intermediate floors. The pressure equalisation opening then enables pressure equalisation to take place between the areas of the pressurised cabin of the aircraft which are adjacent to one another and separated from one another by the partitions and/or intermediate floors.

The prior art, such as, e.g. DE 37 15 328 C1, comprises devices for releasably fastening a decompression panel in a partition provided for use in an aircraft cabin, wherein a retaining element is designed so that it breaks when a predetermined pressure difference acts on the decompression panel. After the retaining element has broken, the decompression panel moves out of its position in consequence of the differential pressure acting on the decompression panel and clears a pressure equalisation opening in the partition.

On the other hand, U.S. Pat. No. 5,871,178 and EP 1 186 531 A1 disclose devices for releasably fastening a decompression panel in a partition provided for use in an aircraft cabin which in each case have retaining elements which retain the decompression panel in its position in the partition through a spring or clamping force. When a predetermined differential pressure acts on the decompression panel, the pressure force acting on the panel exceeds the spring or clamping force applied by the retaining elements, so that the decompression panel moves out of its position in the partition and clears a pressure equalisation opening in the partition.

U.S. Pat. No. 5,085,017 discloses a decompression panel having two flaps which are disposed one inside the other and each of which can be released in one direction.

EP 1 447 326 and US 2005/0082433 A1 disclose cockpit doors which are disposed between a cockpit and a cabin and have a pivotable flap which opens in a decompression situation.

Also known in the prior art are decompression devices having a flap which can be pivoted via an adhesive tape formed as a hinge.

An object of the invention is to provide a decompression device for an aircraft which has a prolonged service life.

SUMMARY OF THE INVENTION

The object is solved by a decompression element or a pressure equalization element for pressure equalization in a cabin of an aircraft. The decompression element comprises a decompression element frame, a flap and a hinge element or at least one bearing element for fitting the flap to the compression element frame. The hinge element or the bearing element is produced from a plastics material. The hinge element or the bearing element ensures that the flap is pivotable over a long period with the same friction.

The decompression element can be formed and/or disposed such that it enables a flow to take place between the cabin area and an area between an outer skin of the aircraft and a cabin lining when the flap is in the open state. This enables pressure equalisation to take place in the cabin as quickly as possible.

The hinge element can be formed in one piece. This hinge element can be produced particularly easily. Here one piece means that a first area of the hinge element is disposable on the flap, a second area is disposable on the decompression element frame and a third area, which is located between the first and the second area, is elastic. The flap can be pivotably disposed on the decompression element frame by means of a plurality of one-piece hinge elements. The hinge element or the bearing element can be produced easily and inexpensively by a casting process, in particular an injection moulding process. The flap and/or the decompression element frame can be produced from a fibre-reinforced plastics material. As fibre-reinforced plastics material can be used for the flap or the decompression element frame and plastics material for the hinge element or the bearing element, the performance of the decompression element according to the invention can be guaranteed over a long period. It is also conceivable to construct the hinge element in multiple parts. The flap and/or the decompression element frame can be produced in sandwich construction. The hinge element can also be machined.

The hinge element can be glued to the flap and/or the decompression element frame. This measure also ensures that the decompression element is operational over a long period and can be produced with a low expenditure.

The bearing element can have two bearing arms. One bearing arm is disposed on the decompression element frame and one bearing arm is disposed on the flap. The two bearing arms are connected to an axis. A plurality of bearing elements can be disposed on one flap and on one decompression element frame. Typically, a flap with two bearing elements is pivotably disposed on the decompression element frame. In this embodiment the friction in the bearing element does not change, or only changes slightly, over a prolonged period.

The flap can be pivotable in both directions. This is particularly relevant if the aircraft has a plurality of cabin areas which are disposed one behind the other or one above the other, for example.

If substantially the same pressure is applied to both sides of the flap, the flap remains in its rest position. If different pressures are applied to both sides of the flap, i.e. there is a pressure difference, the flap is released by a release mechanism if the pressure difference exceeds a predefined threshold value. In this case the flap is pivoted out of its rest position on account of the pressure difference. An air stream between a plurality of cabin areas is therefore enabled, so that the pressure equalisation in the cabin takes place quickly in order to load the structure of the aircraft as little as possible.

The decompression element can comprise a spring which determines the pressure difference at which the flap is opened. This permits a comparatively accurate adjustment of the pressure difference at which the decompression element opens the flap. It is also possible by means of this embodiment for the pressure difference at which the flap is opened not to change, or only to change slightly, over a prolonged period.

The decompression element can also have an adjusting screw and a pressure element. The spring, the adjusting screw and the pressure element can be disposed on the decompression element frame. The adjusting screw acts on the spring and the spring acts on the pressure element such that the pressure element is pressed against the flap in order to adjust the pressure difference at which the flap is opened. The pressure element can be a ball, for example.

The spring, the adjusting screw and the pressure element can alternatively be disposed on the flap. In this embodiment the adjusting screw acts on the spring and the spring acts on the pressure element such that the pressure element is pressed against the decompression frame in order to adjust the pressure difference at which the flap is opened.

The flap is reliably held in its rest position by means of this spring-loaded release mechanism. The adjusting screw enables the force with which the pressure element is pressed against the flap or the decompression element frame to be adjusted. This ensures that the flap can be pivoted before the pressure difference desired to release the flap is reached. In this embodiment the pressure difference which is required for release can be adjusted particularly accurately and guaranteed over a prolonged period.

A sealing profile can be disposed on the flap or on the decompression element frame, with which profile the pressure difference at which the flap is opened is determined. If the sealing profile is disposed on the flap, it can project out from the flap at least partly over an area of the frame in order to prevent the flap from pivoting in the absence of the pressure difference required for release. If the sealing profile is disposed on the decompression element frame, it can project at least partly over an area of the flap in order to prevent the flap from being pivoted before the pressure difference required for release is reached.

The decompression element can have elements which project away from the flap and enable the flap to be returned to a closed position. Tools can engage in the elements which project away. The elements which project away can also be used to bring the flap manually into a closed position. The elements which project away can be tongues which are disposed at one end of the flap, for example the end which is opposite the hinge. Webs can also be disposed on the flap. In one preferred embodiment the web is formed with an engagement area which interacts with the above-mentioned pressure element in order to ensure that the flap is released at a defined pressure difference.

The invention also relates to a decompression device or pressure equalisation device for pressure equalisation in a cabin of an aircraft. The decompression device comprises a decompression device frame and a first opening which enables a flow to take place between a line of an air-conditioning system of the aircraft and the interior space of the decompression device. The decompression device also comprises a second opening which enables a flow to take place between the cabin area and the interior space of the decompression device. A third opening of the decompression device is provided with a pivotable flap. The pivotable flap can open at a predetermined pressure difference. The third opening can be closed by the decompression element described above, and the decompression element frame can be formed integrally with the decompression device frame.

In this embodiment the pivoting of the flap need not necessarily be guaranteed by a hinge element or a bearing element of plastics material, instead other pivoting devices can be used, for example metal hinges, elastic elements, rubber elements or pivoting devices formed from adhesive tape. Even if the flap is not connected to a hinge element or a bearing element of plastics material, the developments of the decompression element described previously can also be used with regard to the decompression device.

The line of the air-conditioning system can be an air supply line, an air suction line and/or a so-called air recirculation line. The air can flow through the second opening out of the line of the air-conditioning system into the cabin or from the cabin into the line of the air-conditioning system. Within the context of this application the term "air-conditioning system" means any device for conditioning the cabin air. When the flap is in the open state the decompression device can enable a flow to take place between the cabin area and an area between the outer skin of the aircraft and the cabin lining. As mentioned above, this enables rapid pressure equalisation in the cabin to be guaranteed. As has been mentioned above, the flap can be pivotable in both directions, so that air can flow both into the cabin area and out of the latter.

However it is also conceivable for the flap which is disposed at the third opening to enable a flow to take place from the cabin into the line of the air-conditioning system or vice versa if a predetermined pressure difference is exceeded at the flap and the flap is pivoted into an open position. In this case the lines of the air-conditioning system must be formed so that they do not collapse when decompression occurs.

The invention also relates to a decompression device with an air-conditioning opening. Air can flow from the air-conditioning system through the air-conditioning opening into a cabin area or from the cabin area to the air-conditioning system. If a predetermined pressure difference is exceeded owing to decompression occurring, i.e. pressure equalisation is required, air flows for pressure equalisation in a cabin through the air-conditioning opening as a result of a closure element being opened on account of a pressure difference. The air can then flow via the air-conditioning opening both into the cabin area and out of the latter.

The invention also relates to the use of an air-conditioning opening, through which air flows from the air-conditioning system into the cabin area or out of the cabin area to the air-conditioning system, for pressure equalisation in a cabin of an aircraft as a result of a closure element being opened on account of a pressure difference.

The closure element can be a flap, in particular the flap described above. The closure element can also be formed as a membrane which breaks when a pressure difference is exceeded.

BRIEF DESCRIPTION OF THE DRAWINGS

The invention is now illustrated in greater detail with reference to the accompanying figures, in which.

DETAILED DESCRIPTION OF THE PREFERRED EMBODIMENT

Figure 1:
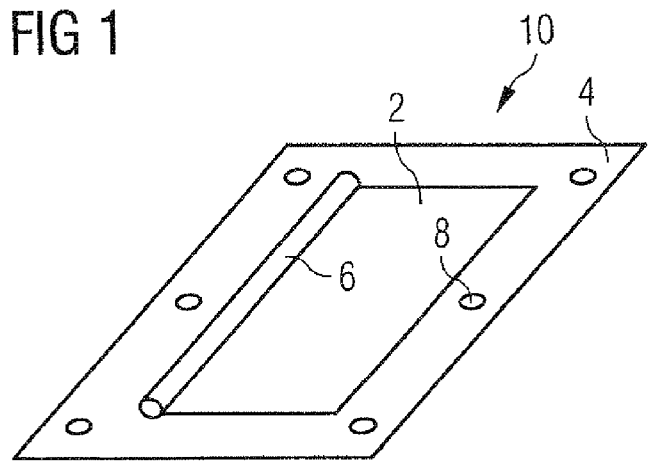
FIG. 1 shows a decompression element in schematic form.

FIG. 1 shows a decompression element or pressure equalization element 10 with a flap 2, a decompression element frame 4 and a hinge 6, with which the flap 2 is pivotably connected to the decompression element frame 4. The flap 2 and/or the decompression element frame can be produced from fiber-reinforced plastics material and/or in sandwich construction. The decompression element frame 4 has a plurality of fitting elements 8, for example openings or areas which project away in order to fit the decompression element 10 to the cabin lining, for example. The hinge 6 can be produced from plastics material. If there is a pressure difference which exceeds a predetermined threshold value over the flap 2, the flap 2 is pivoted and air can flow through the resulting opening in the decompression element frame 4 in order to bring about pressure equalization in the cabin of an aircraft.

Figure 2:
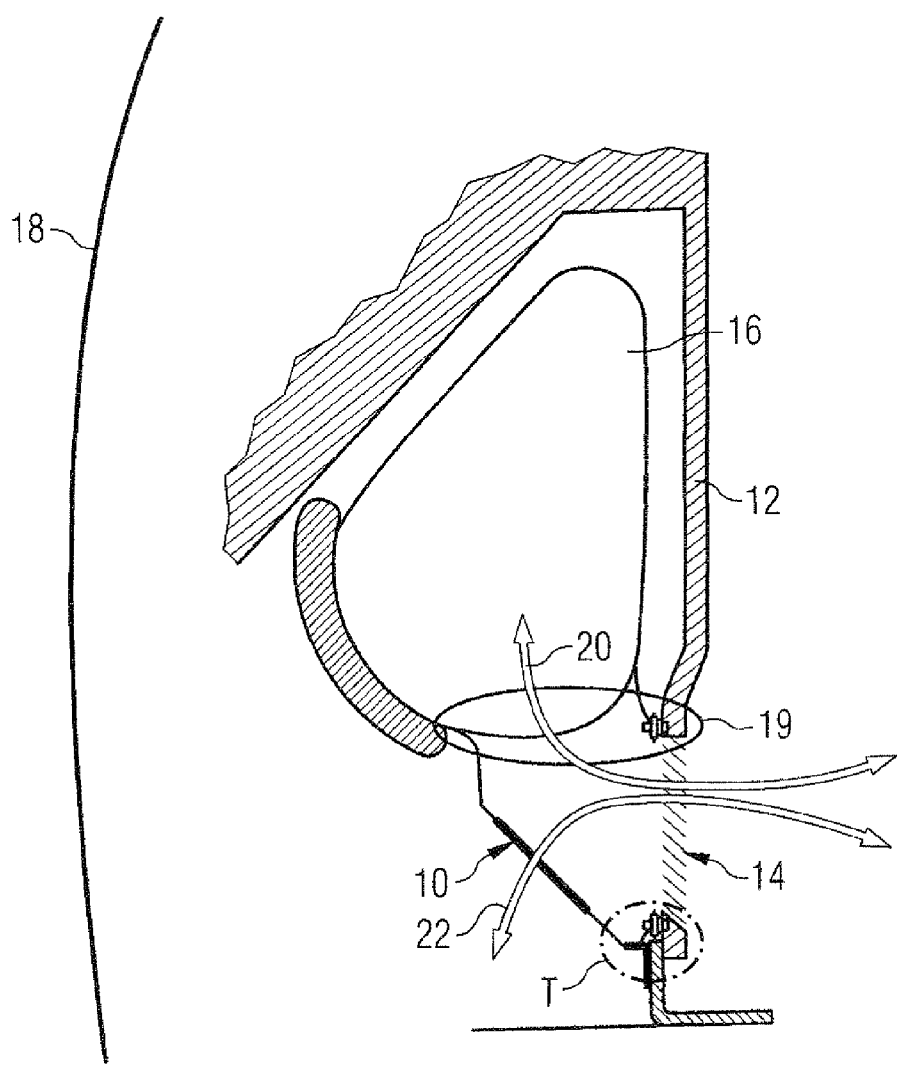
FIG. 2 shows in schematic form the air flows in normal operation and in a decompression situation, in which pressure equalisation in the cabin is required.
Figure 3:
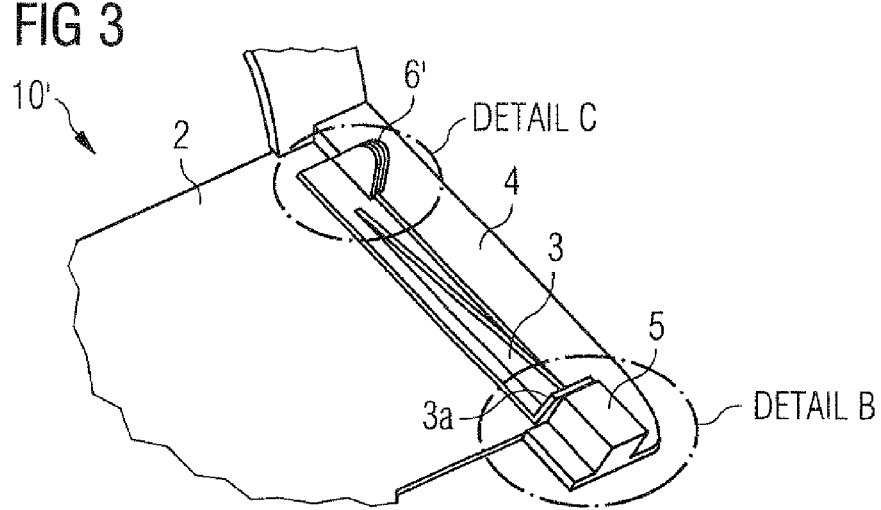
FIG. 3 is a perspective representation of a first embodiment of the decompression element.

FIG. 2 shows a section through a decompression device or pressure equalisation device for an aircraft in which the decompression element 10 is installed. The reference number 12 indicates a cabin lining and the reference number 14 indicates an air-conditioning opening which is provided with a grille or ventilation grating and through which air can flow into or out 20 of the cabin. A line 16 is connected to an air-conditioning system of the aircraft and supplies air to or removes it from the cabin area through the air-conditioning opening 14 and line opening 19. The reference number 18 indicates the outer skin of the aircraft in schematic form. In a decompression situation, i.e. if there is a leak in one of the cabin areas of an aircraft and pressure equalisation in the cabin is required, there is a pressure difference at the decompression element 10. This results in the flap of the decompression element 10 being pivoted (not shown). The air can then flow from the cabin area into or out of an area between the outer skin 18 of the aircraft and the cabin lining, as indicated by the arrow 22. It is understood that in a decompression situation the air does not necessarily have to flow between the outer skin 18 of the aircraft and the cabin lining. Any desired closure element which enables an air flow when a pressure difference is exceeded over the closure element can be used instead of the decompression element 10 with the flap 2. For example, it is possible to use a membrane which breaks when a pressure difference is exceeded.

Figure 4:
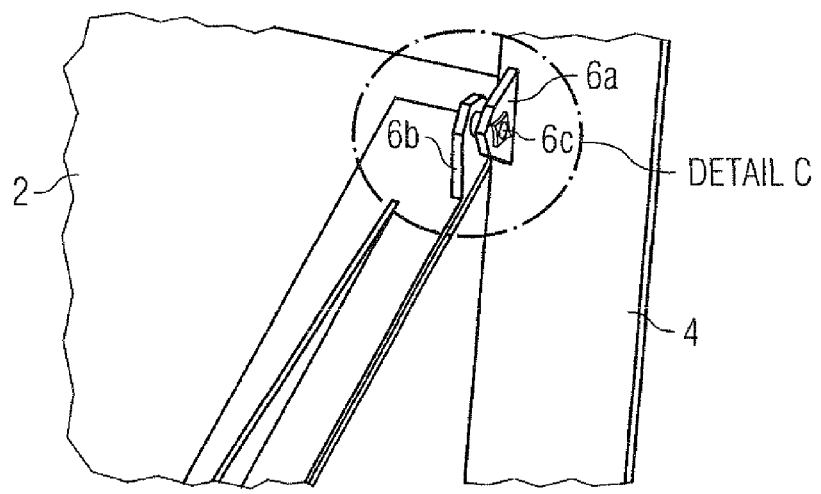
FIG. 4 is a perspective detailed representation of a bearing element of the first embodiment of the decompression element.

FIGS. 3 to 6 show developments of the decompression element. A flap 2 is fitted to a decompression element frame 4 via a bearing element 6'. FIG. 4 shows a first bearing arm 6a which is disposed on the decompression element frame 4. A second bearing arm 6b is disposed on the flap 2. A (short) axis 6c connects the first bearing arm 6a to the second bearing arm 6b. The bearing arms 6a, 6b can be formed integrally with the flap or the decompression element frame, connected and/or glued thereto. In this embodiment the flap is disposed with two bearing elements on the decompression element frame 4. A web 3 is formed on the flap, in which web a tool can engage in order to be able to bring the flap back into the rest position if it has been opened on account of a predetermined pressure difference being exceeded. The web 3 can of course also be used to move the flap 2 manually back into its normal position. An engagement area 3a for a release device is provided at the web 3, which device is disposed in a release device housing 5.

Figure 5:
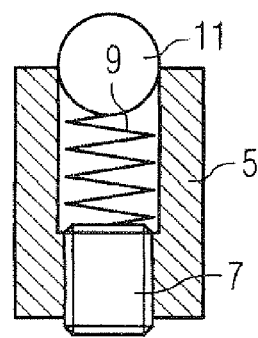
FIG. 5 is a schematic representation of a release device.

The release device is described in greater detail with reference to FIG. 5. An adjusting screw 7, a spring 9 and a pressure element 11, for example a ball, are disposed in the release device housing 5. The force with which the spring 9 preloads the pressure element 11 can be adjusted by means of the adjusting screw 7. The pressure element 11 is consequently pressed against the engagement area 3a. The greater the force with which the pressure element 11 is pressed against the engagement area 3a, the greater the predetermined pressure difference which is required in order to pivot the flap into its open position. An indentation (not shown) can be provided at the engagement area 3a, in which indentation the pressure element is at least partly accommodated if the flap 2 is in its rest position. The force with which the spring 9 presses against the pressure element 11 and therefore the pressure difference which is required for release can be adjusted by means of the adjusting screw 7. The adjusting screw 7 can be secured in its position with a securing lacquer. The adjusting screw 7 can have an engagement area in which a conventional screwdriver can engage. Moreover, the engagement area of the adjusting screw 7 can be formed such that a special tool is required in order to operate the adjusting screw. It is thereby possible to ensure that the release pressure of the decompression element cannot be adjusted to a wrong value by unauthorised persons.

Figure 6:
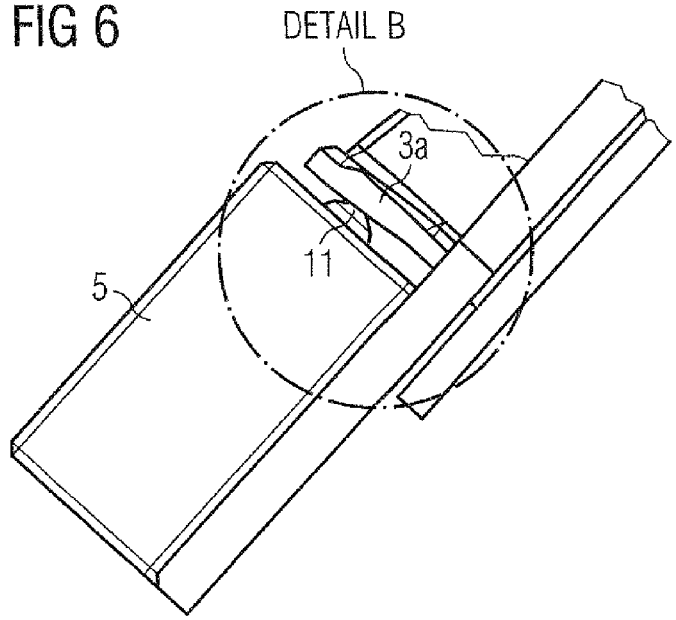
FIG. 6 shows details of the release device and a flap of the decompression element.

FIG. 6 is a detailed view of the release device housing 5 and the engagement area. The pressure 11 element, which, as described previously, is preloaded, is pressed against the engagement area 3a in order to ensure that the flap 2 is pivoted when a predetermined pressure difference is reached. The area of the pressure element which faces the engagement area 3a can be rounded.

Figure 7:
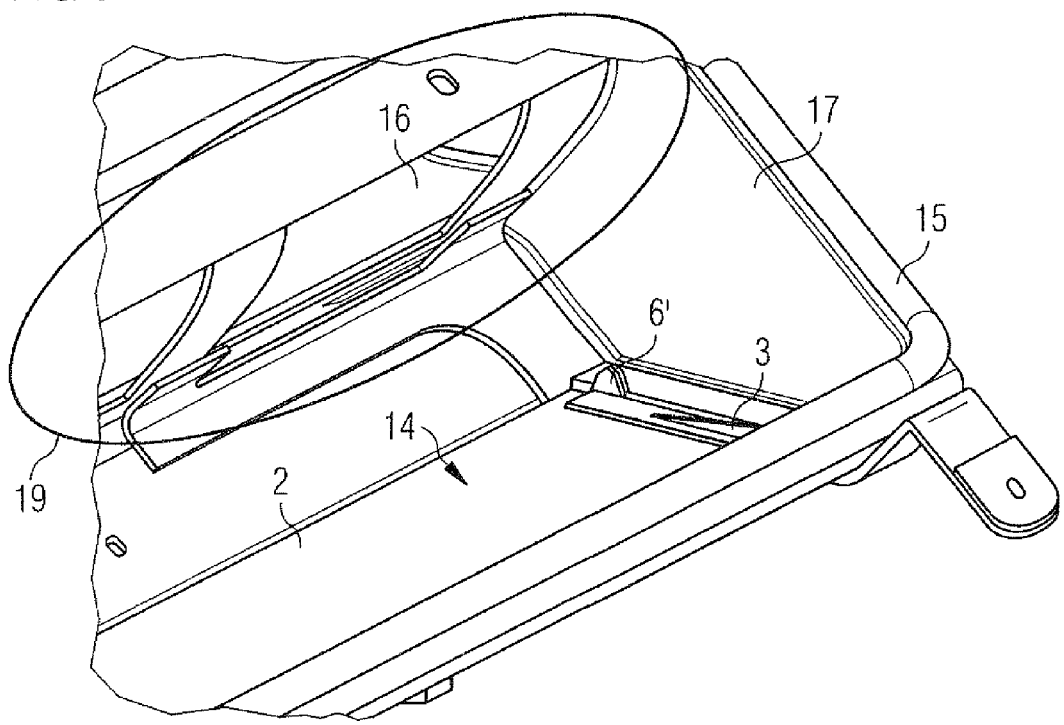
FIG. 7 shows a decompression device with the first embodiment of the decompression element.

FIG. 7 shows the arrangement of the embodiment described previously of the decompression element in a decompression device. The decompression device comprises a decompression device frame 17. The flap 2 is disposed on the decompression device frame 17 via a hinge element 6' which is formed in one piece with the decompression element frame, for example. The reference number 3 indicates the web 3 described previously in order to enable the flap 2 to be brought back into its rest position following its release. The decompression device is disposed at a line 16 of an air-conditioning system. Air flows through the line opening 19 out of the line 16 into the decompression device or out of the latter. The reference number 15 indicates an edge of an air-conditioning opening into which air can flow out of the cabin into the decompression element or vice versa. The air-conditioning opening 14 can be closed by the grille or grating which is shown in FIG. 2. In the absence of a decompression situation, i.e. the flap 2 of the decompression device is closed, the air flows between the cabin area and the line 16 through the decompression device through the line opening 19 and the air-conditioning opening 14. If there is a decompression situation, i.e. a predetermined pressure difference is exceeded, the flap 2 opens and the air flows past the flap 2 into the cabin area or out of the cabin area.

The decompression device can be produced from a plastics material, in particular a fibre-reinforced plastics material. The decompression device can also be produced in a sandwich construction. The decompression element frame can be glued to the decompression device, in particular the decompression device frame. The decompression element frame can also be formed integrally with the decompression device frame 17.

Figure 8A:
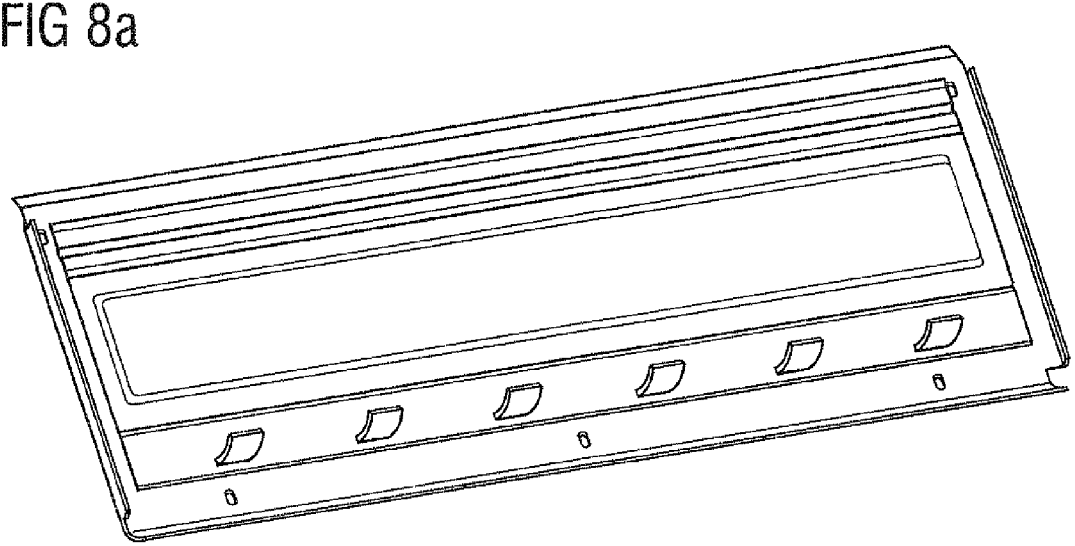
FIGS. 8a and 8b show the second embodiment of the decompression element in schematic form.
Figure 8B:
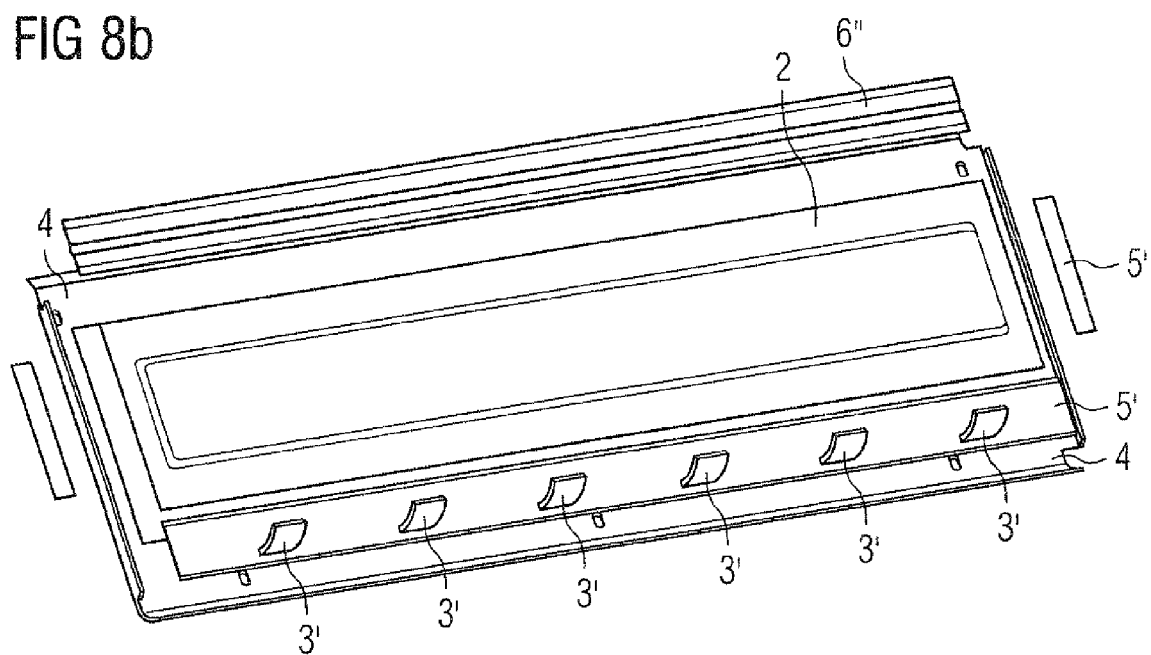

FIG. 8*a* shows a second embodiment of the decompression element and FIG. 8*b* is an exploded view of the second embodiment of the decompression element. The flap 2 is disposed on the decompression element frame 4 via a one-piece hinge 6". The one-piece hinge element 6' is preferably formed from plastics material and is produced, for example, by an injection moulding process. The hinge element 6" can be connected, in particular glued, to the decompression element frame 4 and/or the flap. Seals 5' are disposed on the flap, with which seals the pressure difference at which the flap is pivoted out of its rest position is determined. The seals 5' can be sealing films. The seals 5' can be connected, in particular glued, to the flap or the frame. The reference number 3' represents tongues which serve to pivot the flap back into its closed position following release. The tongues can be disposed on the seal 5' or on the flap 2. The tongues 3' are preferably formed integrally with the seal 5' and project away at one end of the seal 5'. The tongues 3' are preferably disposed at the end of the flap 2 which is opposite the hinge element 6".

It is understood that elements of the first embodiment and of the second embodiment of the decompression element can be combined.

Figure 9:
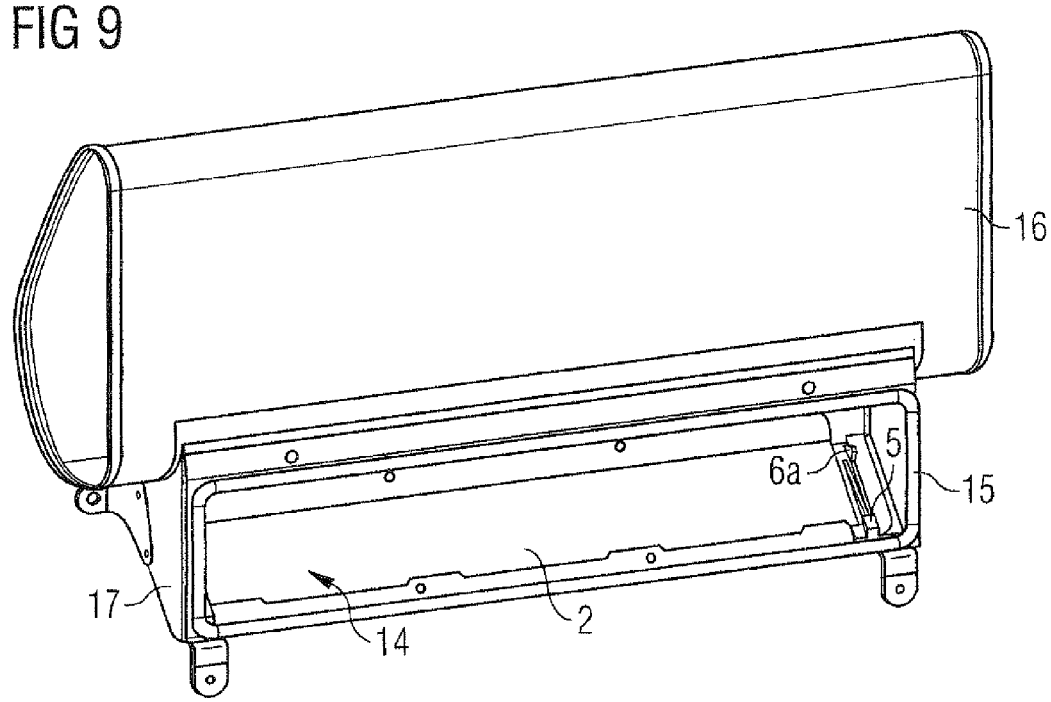
FIG. 9 shows the decompression device in normal operation.

The mode of operation of the decompression element and the decompression device is described in greater detail with reference to FIGS. 2, 7, 9 and 10. The decompression device frame 17 is disposed at the line 16 of the air-conditioning system. In normal operation, i.e. in the absence of a decompression situation, the flap 2 is closed (see FIGS. 2, 7 and 9) and the air flows between the line 16 and the cabin area through the air-conditioning opening 14. The decompression device comprises the line opening 20 which is described above (see FIGS. 2 and 7) and through which the air can flow from the line 16 to the cabin area or vice versa. The air-conditioning opening 14 can be closed by a grating or grille. In FIGS. 7 and 9 the reference number 6' indicates the previously described bearing element and the reference number 5 indicates the housing of the release device.

Figure 10:
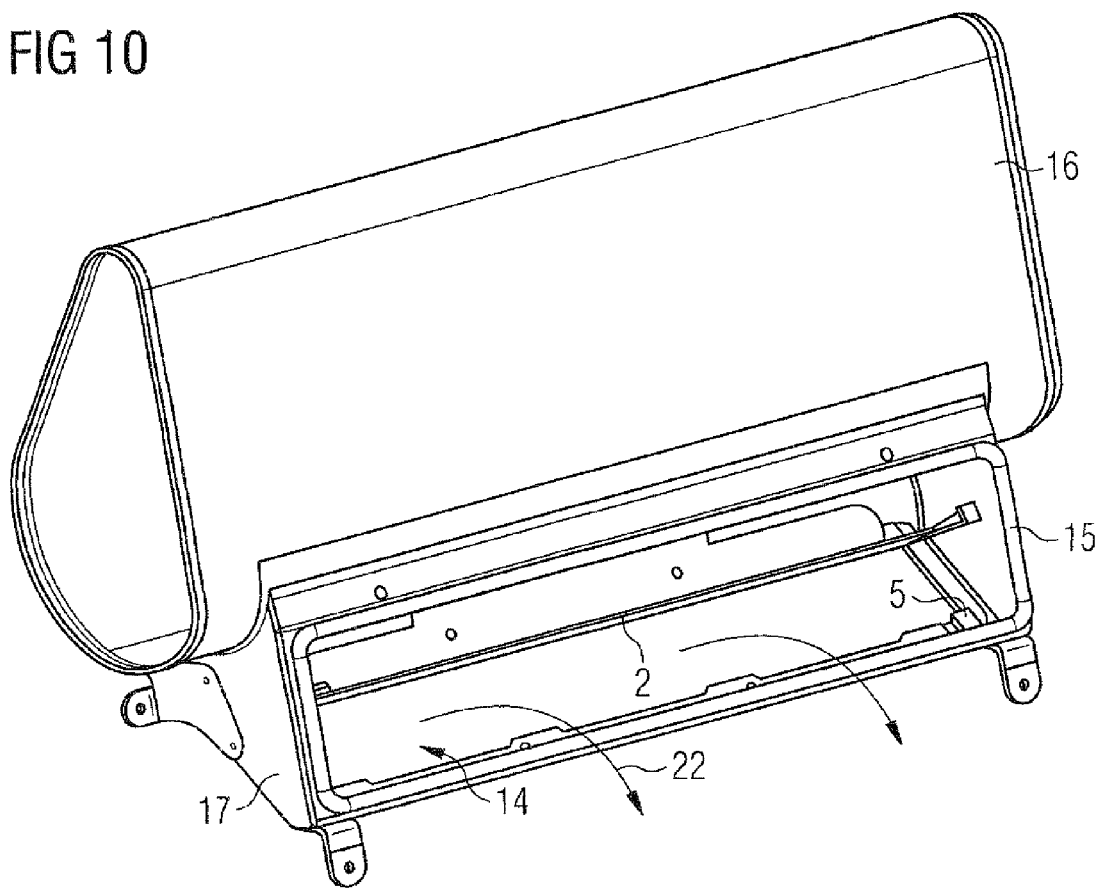
FIG. 10 shows the decompression device during pressure equalisation in the cabin.

FIG. 10 represents the so-called decompression situation in which pressure equalisation is required. There is a negative pressure in the cabin area and the release device 5 has therefore released the flap, as the predetermined pressure difference has been exceeded. The flap has been pivoted into the open position shown in FIG. 10 on account of the pressure difference. Air flows out of an area between the outer skin 18 of the aircraft (FIG. 2) and the cabin lining 12 (FIG. 2) into the cabin area (see arrow 22). The air flows through the air-conditioning opening 14 into the cabin area. As mentioned previously, the air-conditioning opening 14 can be closed by a grating or grille. The decompression device can be disposed, for example, at a recirculation line in the upper deck of an aircraft with two decks. Similar or different decompression devices can be disposed in the lower deck. If a pressure drop occurs in one of the decks, the air can flow from one deck to the other through the area between the outer skin 18 of the aircraft and the cabin lining 12. If the pressure drop does not occur in the cabin area in which the decompression device is disposed, but rather in another, the air flows out of the cabin area into the space between the outer skin 18 of the aircraft and the cabin lining 12. The flap 2 would consequently not be pivoted in the direction which is shown in FIG. 10, but rather in the opposite direction.

It is understood that the decompression device does not necessarily have to have a decompression element with a flap. It is possible to use any desired closure element instead of the decompression element, for example a membrane which breaks under a pressure difference.

The decompression element according to the invention and the decompression device according to the invention are resistant to aging, as fibre-reinforced plastics materials and injection moulding materials as well as sandwich processes are used. A reliable release mechanism which can be reliably adjusted is provided by means of mechanically fully developed technologies. After the system has been released, the flap can be brought back into its original position by webs on the flap or by tongues disposed on the flap.

The invention claimed is:

1. A decompression element for pressure equalization in a cabin of an aircraft, comprising:
    a decompression element frame;
    a flap;
    one of a hinge element and at least one bearing element for fitting the flap to the decompression element frame, wherein the flap is rotatable in two rotational directions away from a closed position in which the flap closes flow through the decompression element frame;
    at least one projecting element coupled to the flap so as to project away from the flap, at least one of the projecting elements including an engagement area; and
    a release device coupled to the decompression element frame and including a release device housing, a pressure element moveable relative to the release device housing, a spring biasing the pressure element into contact with the engagement area of the at least one projecting element when the flap is in the closed position, and an adjusting screw coupled to the release device housing and operable to adjust the bias applied to the pressure element, thereby defining a predetermined pressure difference across the flap at which forces applied by the predetermined pressure difference will overcome the bias applied to the pressure element to move the flap to an open position and enable flow through the decompression element frame,
    wherein when a pressure difference across the flap in either direction exceeds the predetermined pressure difference, the engagement area is released from contact by the pressure element such that the flap may rotate from the closed position to the open position.

2. The decompression element according to claim 1, wherein the decompression element is formed such that it enables a flow to take place between the cabin area and an area between an outer skin of the aircraft and a cabin lining when the flap is in the open position.

3. The decompression element according to claim 1, wherein the hinge element is formed in one piece.

4. The decompression element according to claim 1, wherein the hinge element or the bearing element is produced by a casting process, in particular an injection molding process.

5. The decompression element according to claim 1, wherein the flap and/or the decompression element frame are/is produced from fiber-reinforced plastics material and/or in sandwich construction.

6. The decompression element according to claim 1, wherein the hinge element is glued to the flap and/or the decompression element frame.

7. The decompression element according to claim 1, wherein the bearing element includes two bearing arms, wherein one bearing arm is disposed on the decompression element frame and another bearing arm is disposed on the flap, and the two bearing arms are connected to an axis.

8. The decompression element according to claim 1, wherein the hinge element or the bearing element is formed from a plastics material.

9. The decompression element according to claim 1, wherein the at least one projecting element is configured to be gripped to move the flap into the closed position.

10. A decompression device for pressure equalization in a cabin of an aircraft, comprising:
   a decompression device frame,
   a first opening via which an interior space of the decompression device can be connected to a line of an air conditioning system of the aircraft,
   a second opening via which the interior space of the decompression device can be connected to the cabin area,
   a third opening, and
   the decompression element of claim 1, which is located at the third opening to selectively permit flow into or out of the interior space of the decompression device.

11. The decompression device according to claim 10, wherein when mounted in an aircraft and the flap is in the open position, the decompression element enables a flow to take place between the cabin area and an area between an outer skin of the aircraft and a cabin lining.

* * * * *